United States Patent [19]

Kennedy

[11] 4,020,941
[45] May 3, 1977

[54] ARTICLE INVERTER
[75] Inventor: Francis Millard Kennedy, Lynchburg, Va.
[73] Assignee: Simplimatic Engineering Co., Lynchburg, Va.
[22] Filed: Oct. 28, 1975
[21] Appl. No.: 625,907
[52] U.S. Cl. .............................. 198/402; 198/416; 214/1 Q
[51] Int. Cl.$^2$ ....................................... B65G 47/24
[58] Field of Search ............ 214/1 Q, 1 QA, 1 QB, 214/1 R; 198/402, 416

[56] References Cited
UNITED STATES PATENTS

| | | | |
|---|---|---|---|
| 2,677,452 | 5/1954 | Mallow et al. | 198/283 |
| 3,070,934 | 1/1963 | Du Broff | 198/284 X |
| 3,074,530 | 1/1963 | Rosenleaf | 198/284 |
| 3,080,041 | 3/1963 | Luce | 198/284 |
| 3,887,066 | 6/1975 | Houtsager | 198/283 X |

FOREIGN PATENTS OR APPLICATIONS 1,169,844   5/1964   Germany ........................... 198/284

*Primary Examiner*—Frank E. Werner
*Attorney, Agent, or Firm*—James & Franklin

[57] ABSTRACT

Apparatus for inverting an article being transported by a conveyor includes means extending into the travel path of the article to restrict the forward motion of the leading portion of the article relative to the forward motion of the trailing portion of the article, thus causing the leading portion to rise relative to the trailing portion until the article is partially inverted to an overcenter position, and means to permit the overcenter leading portion to descend, preferably maintaining engagement with the article as the leading portion descends, thereby to controllably deposit the article on the conveyor in a fully inverted position.

16 Claims, 9 Drawing Figures

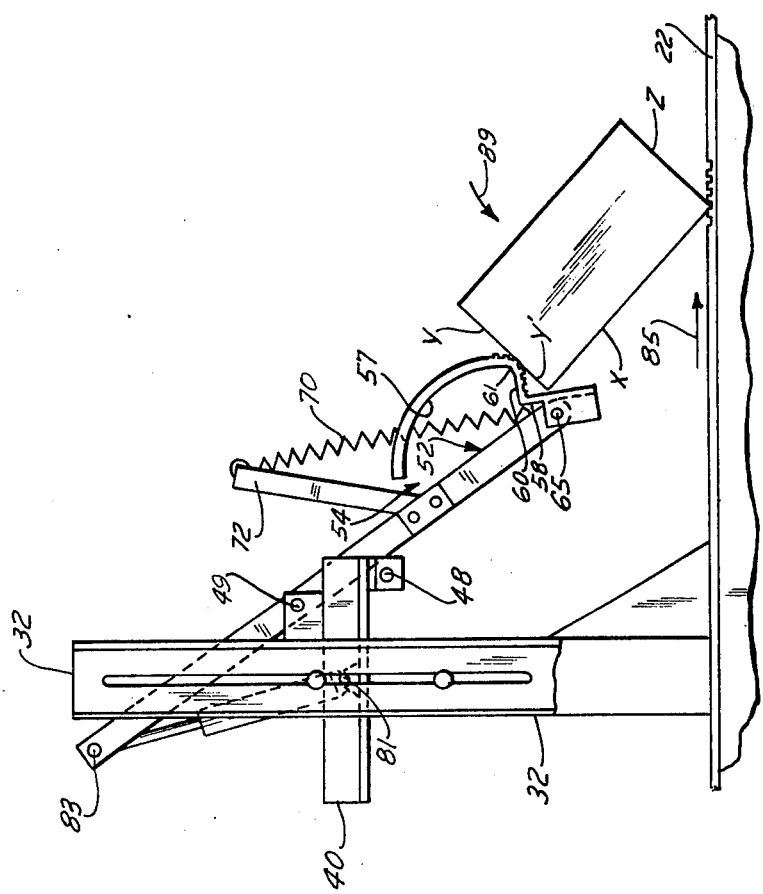
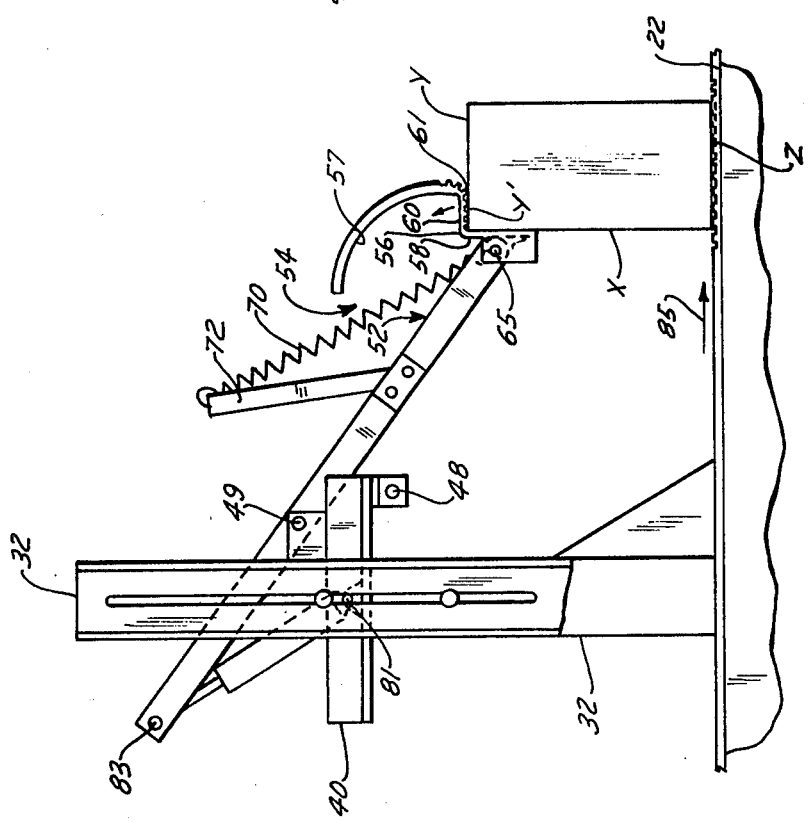

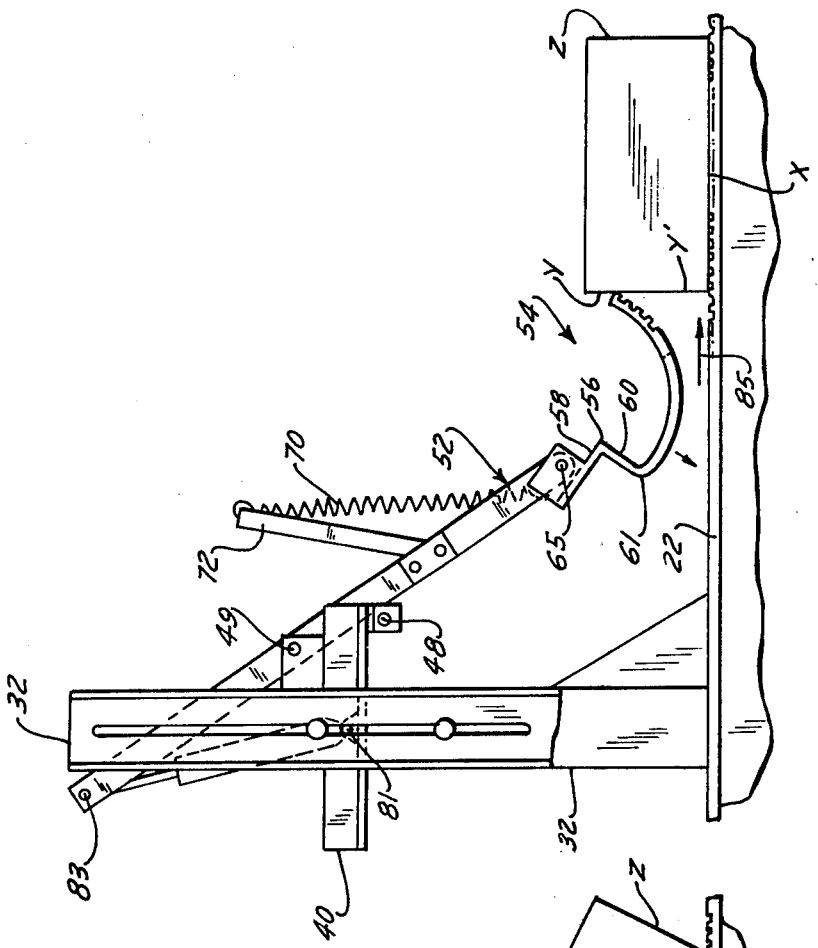
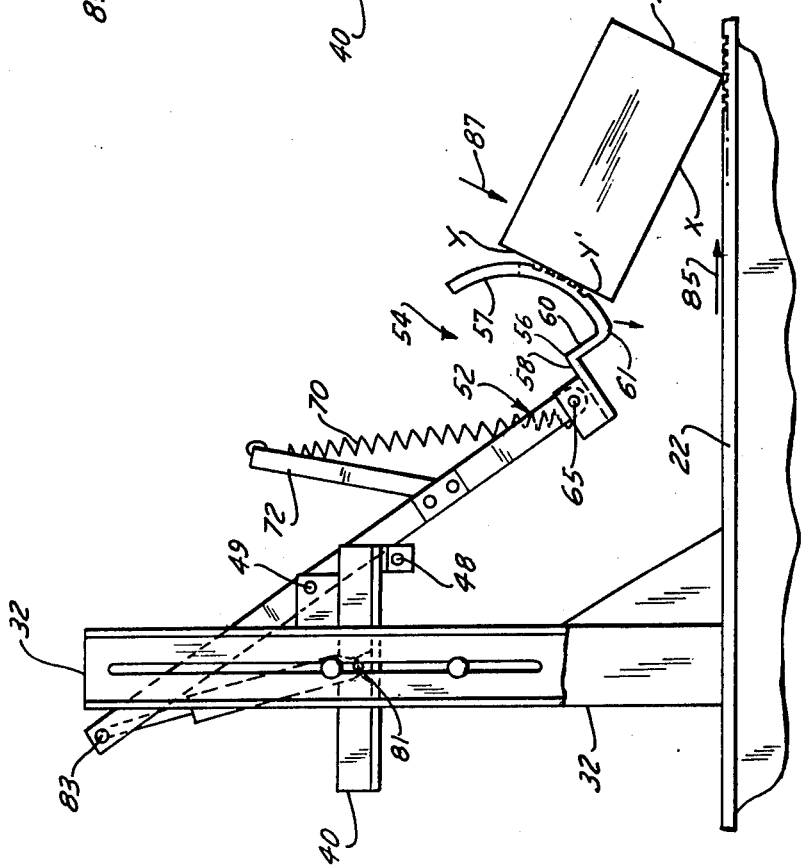

ARTICLE INVERTER

BACKGROUND OF THE INVENTION

The present invention relates to apparatus for inverting an article, and more particularly to an apparatus for inverting an article being transported by a conveyor.

It is frequently desirable to provide apparatus for inverting an article, such as a carton, box or the like, for any of a variety of purposes, such as sealing, cleaning, filling and the like. In the event that either the articles to be inverted, or the contents thereof, are fragile in nature, it is necessary that the inversion of the article be controlled, especially after it has reached an unstable overcenter position, to prevent the partially inverted article from falling with an impact sufficient to cause breakage. The known inversion apparatus fail to provide such "positive control" and are thus not well suited for use with fragile articles.

Frequently, it is desirable that the inverting apparatus be capable of operation in a mode such that inversion is effected of not all the articles being transported seratim by the conveyor past the inverting apparatus, but of only selected articles on the conveyor.

For the point of view of economy and simplicity of operation, it is also desirable to provide an inverting apparatus which is passive in nature and does not require any special power input to effect inversion of the articles being transported by the conveyor belt, but relies rather on natural forces (e.g., gravity) and the motive force of the conveyor.

Accordingly, it is an object of this invention to provide apparatus for inverting an article which is effective to invert an article being transported by conveyor by a purely mechanical operation without any power input being provided to the inversion apparatus.

It is also an object to provide such apparatus which at all times controls the inversion operation and precludes an uncontrolled descent of the article from the unstable overcenter position.

It is a further object to provide such apparatus which is useful for inverting fragile articles or articles containing fragile contents.

Another object is to provide such apparatus which will selectively invert selected articles transported thereby on a conveyor without inverting others.

SUMMARY OF THE INVENTION

The above recited objects of the present invention may be obtained in an apparatus for inverting an article designed for use with a conveyor transporting the article, the article when thus transported having an initially leading portion and an initially trailing portion. The apparatus comprises a support, and first and second means movably mounted on the support. The first means extends into the travel path of the article on the conveyor and, when engaging the article, is effective to restrict the forward motion of the leading portion relative to the forward motion of the trailing portion and cause the leading portion to rise relative to the trailing portion until the article is partially inverted to an overcenter position. The second means permits the overcenter leading portion to descend, thus depositing the article on the conveyor in the fully inverted position. In a preferred embodiment of the present invention adapted for use with fragile articles, the second means maintains engagement with the article as the leading portion descends, thereby to controllably deposit the article on the conveyor and preclude breakage thereof.

More particularly, and in the particular embodiment here illustrated, the inversion apparatus comprises a carrier arm articulately mounted on a support and biased toward the travel path of the article from above, and an article-engaging member movably mounted on a portion of the center arm close to the article and extending from the carrier arm into the travel path of the article for engagement therewith. Broadly speaking, the article engaging member is comprised of an angled section defining the above-defined first means and an arcuately bowed section defining the above-defined second means. The angled section is preferably a right angle section having a first leg pivotally mounted on the forward portion of the carrier arm at a point spaced from the vertex of the angled section and a second leg extending into the travel path of the article. The arcuately bowed section extends from the second leg for maintaining supporting pressure on the overcenter leading portion of the article, urging the overcenter leading surface towards the conveyor until the article is in a substantially fully inverted position. The arcuately bowed section is configured and dimensioned so that the point of contact between the overcenter leading surface and the arcuately bowed section travels along the surface of the arcuately bowed section from an end portion thereof adjacent the second leg toward the other end portion thereof. Thus, the arcuately bowed section maintains supporting pressure on the article by continuously exerting against the leading surface of the article a force having a component in the direction of travel of the article.

The apparatus preferably includes means which, when actuated, pivots the carrier arm to a position wherein the article engaging member is raised above the top of the article being transported by the conveyor belt, so that the inversion apparatus does not contact, and hence does not act, upon the articles.

Typically the leading portion of the article is defined by an essentially vertical surface of the article, the above-defined first and second means both engaging that vertical surface in due course. The first means engages one section of the vertical surface (i.e., the leading portion), and the second means engages at least in part a different section of the vertical surface, the first means releasing engagement of its surface section as the second means engages its surface section.

The present invention further includes the inversion apparatus in combination with a conveyor on which the article is adapted to be conveyed, the conveyor including means engagable with the trailing portion and effective to preclude slippage of the trailing portion relative to the conveyor. Preferably, the engagable conveyor means is a conveyor belt having an article engaging surface defining a plurality of transverse ridges into which the trailing portion of the article descends as the article is tipped from its horizontal position. The arcuately bowed section, and preferably the second leg of the angled section as well, have article engaging surfaces effective to preclude slippage of the leading surface of the article relative thereto, such article engaging surfaces typically defining a plurality of transverse ridges adapted to grip the leading surface, and often a leading corner, of the article. Thus, where an unstable overcenter article is being carried in a non-slip fashion at one end (the trailing end) by the conveyor and at the other end (the leading end) by the arcuately bowed section, the descent of the article from the unstable overcenter position is under full control of the inversion apparatus, the descent speed being determined by the transporting speed of the conveyor.

BRIEF DESCRIPTION OF THE DRAWING

FIGS. 4-9 are fragmentary side elevation views thereof, illustrating the sequence of positions assumed by the inverting apparatus and the article during inversion of an article.

DETAILED DESCRIPTION OF THE PREFERRED EMBODIMENTS

Figure 1:
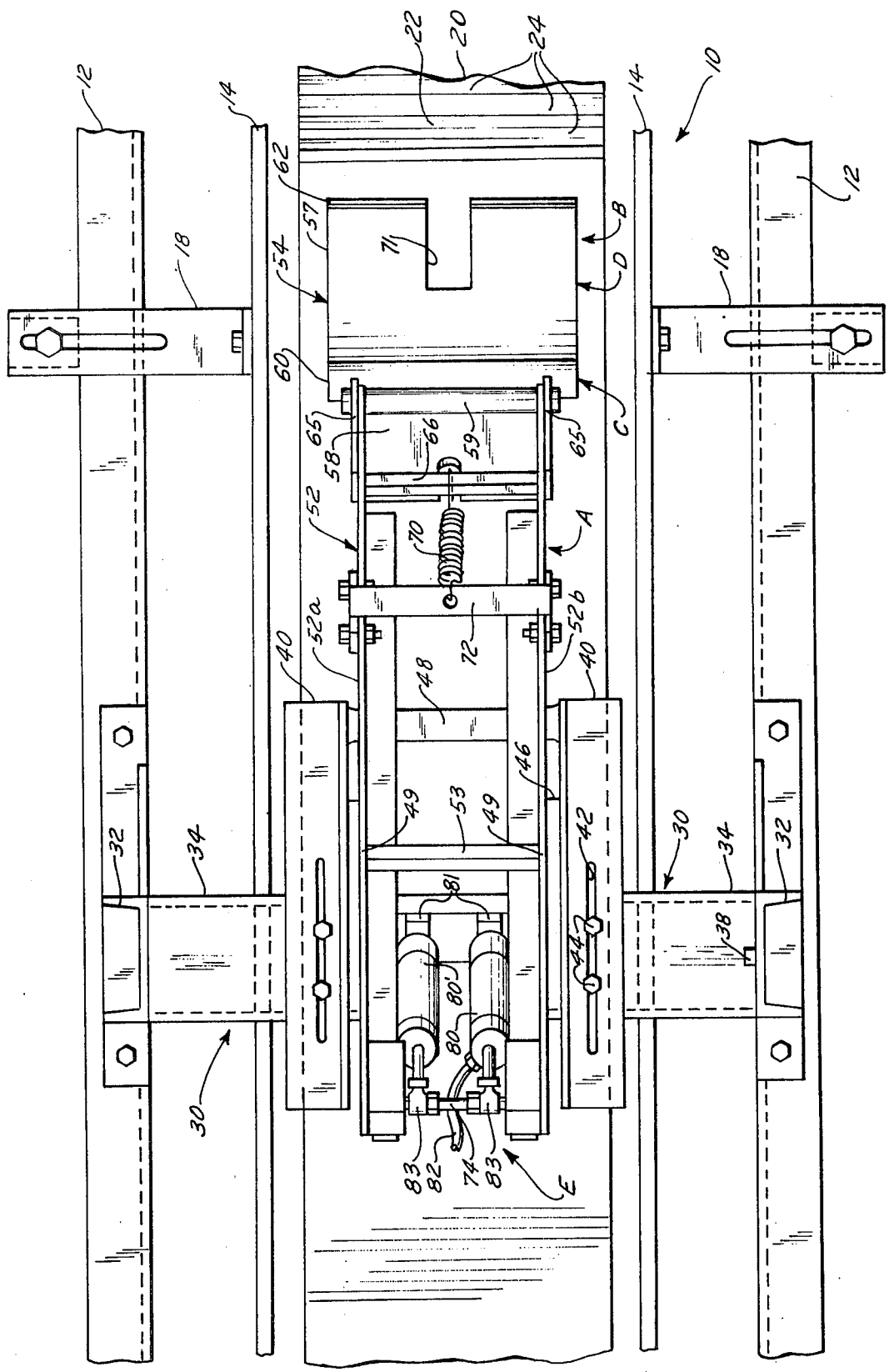
FIG. 1 is a fragmentary top plan view of inverting apparatus according to the present invention.
Figure 2:
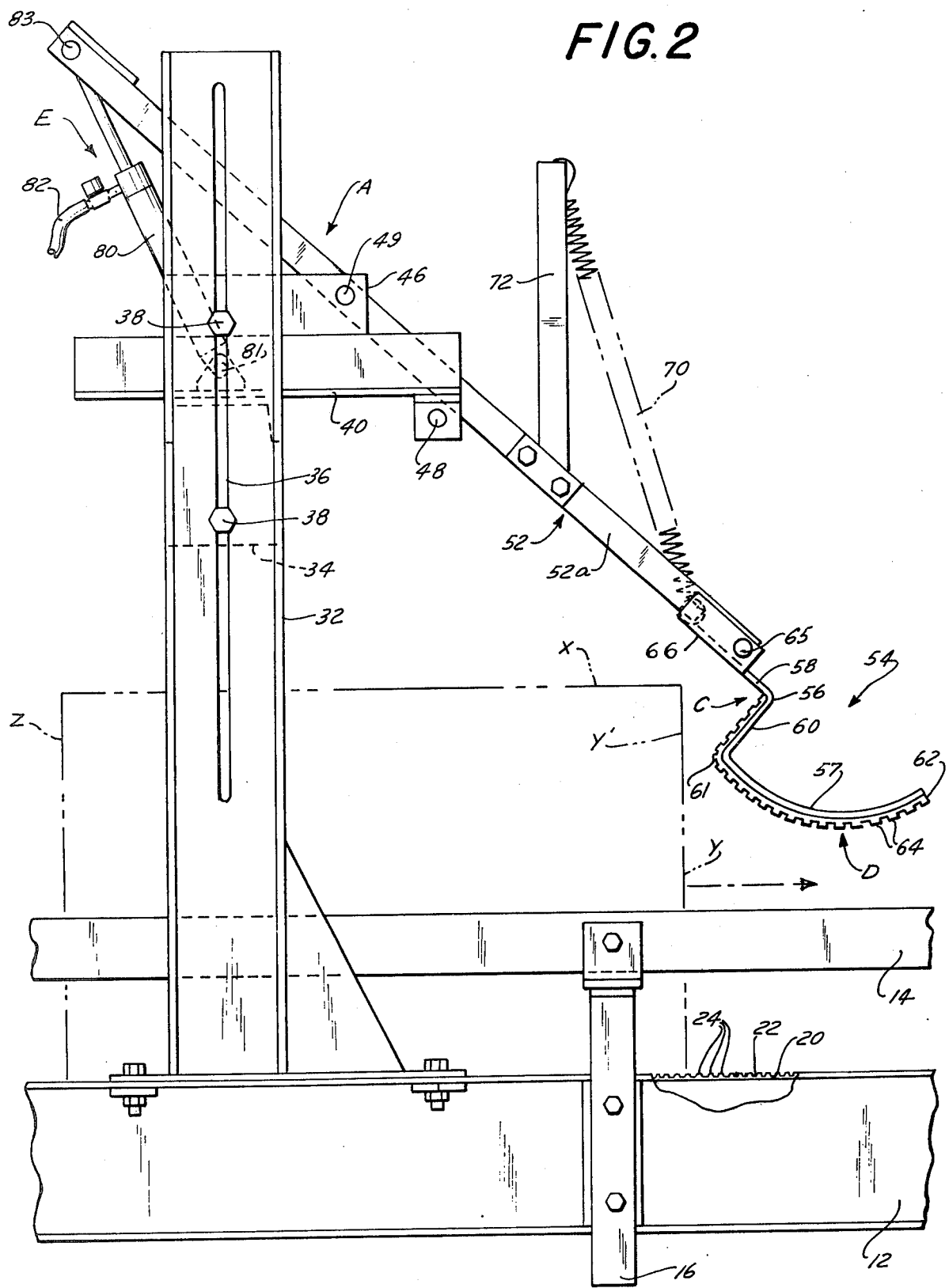
FIG. 2 is a fragmentary side elevation view thereof, with portions removed to illustrate details of internal construction and with an article to be inverted illustrated in phantom line.
Figure 3:
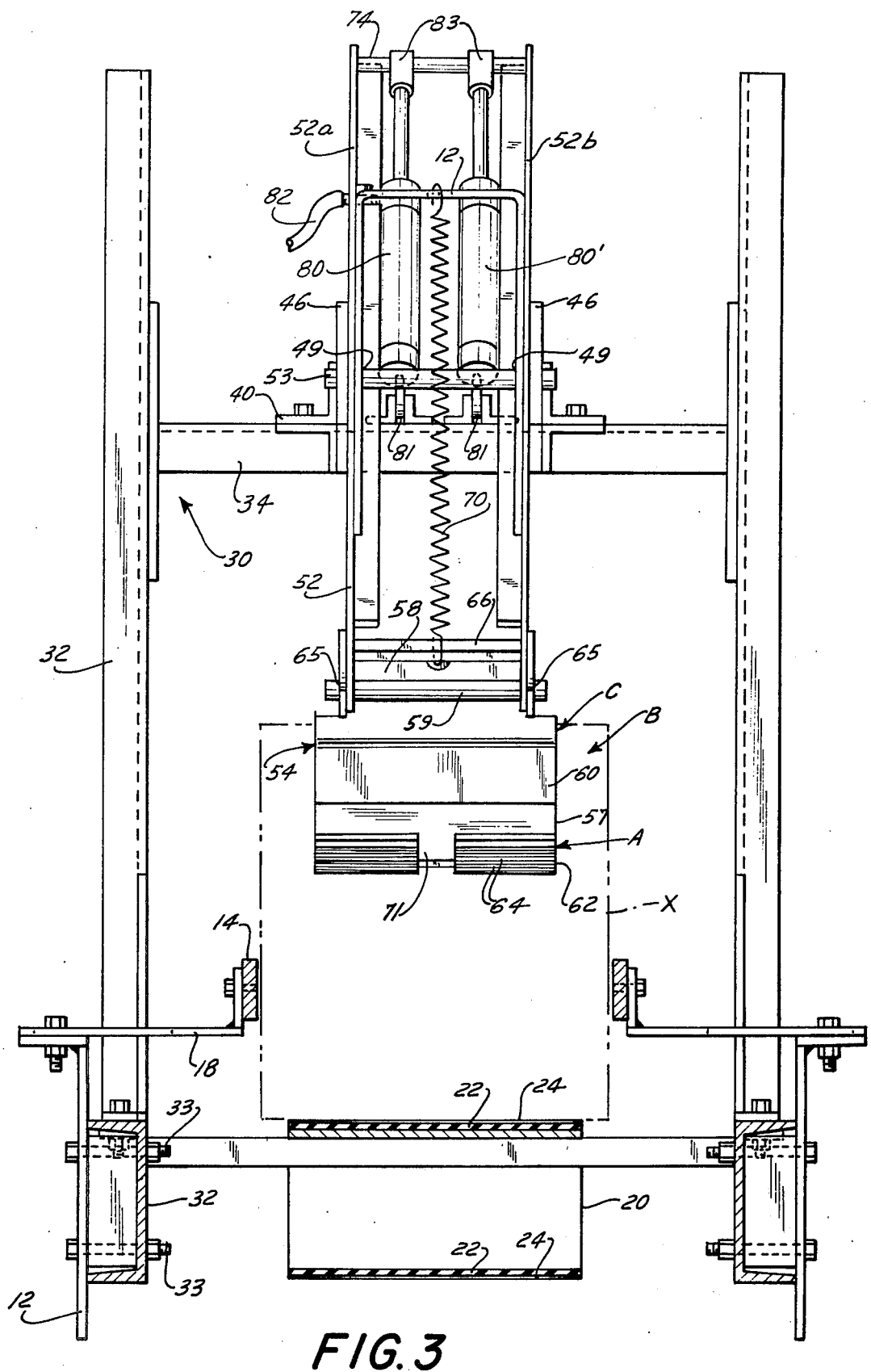
FIG. 3 is a front elevation view thereof, partially in cross section, with the article to be inverted illustrated in phantom line.

Referring now to the drawing, and in particular to FIGS. 1-3 thereof, therein illustrated is a conveyor assembly generally designated by the numeral 10 and comprising a conveyor frame 12, a pair of article guides 14 positioned above the conveyor frame 12 by means of horizontally adjustably guide brackets 18, and an endless traveling belt 20 passing over drive rolls (not shown). The conveyor assembly 10 is generally of conventional design with the guide rails 14 being adjusted adjacent and over conveyor belt 20 in such manner as to prevent articles X carried by the conveyor belt 20 from being accidentally displaced therefrom. Preferably the conveyor belt 20 has a carrying surface 22 adapted to carry the articles X without permitting slippage of the articles X along the travel axis of the conveyor belt 20. This is preferably accomplished by means of a plurality of ridges or protrusions 24 on the carrying surface 22 extending transversely to the travel axis so that, especially when the bottom surface of the article X being transported is at an angle to the horizontal axis of the conveyor belt 20, the weight of the article X forces the lowered corner or edge thereof into the gap between ridges 24 to lock such corner or edge for travel with the ridges 24 and hence the conveyor belt 20. While the ridged configuration of the carrying surface 22 is very effective in minimizing slippage, alternatively the carrying surface 22 may be formed of a cushiony material into which the lowered edge of a tilted article X will dig, thereby locking the lower edge for travel with the belt 20. Other carrying surfaces 22 adapted to carrying an article X without slippage may also be used. Furthermore, while the conveyor belt 20 has been described as an endless belt, it is also possible to utilize a series of interconnected rigid plates for the same purpose, the plates preferably being covered with or otherwise providing the aforementioned non-slip or positive engagement surface 22.

Affixed to the conveyor assembly 10 is an H frame generally designated by the numeral 30 and comprising a pair of vertically-extending uprights 32 mounted on frame 12 by fasteners 33 and a horizontally-extending cross-member 34 disposed above and transverse to the conveyor belt 20. In order to permit adjustment of the vertical height of the cross-member 34, the inner surface of each upright member 32 is provided with a vertically-extending slot 36 and the cross-member 34 is affixed to the uprights 32 by means of bolts 38 which pass through slot 36. Bolts 38 may be loosened to permit their travel along slot 36, thus raising or lowering cross-member 34, and tightened to preclude such travel, thus fixing the height of cross-member 34. A horizontally extending base member 40 is movably mounted on the cross-member 34 by means of slots 42 therein extending parallel to the conveyor belt axis and bolts 44 which pass through slots 42 and cross-member 34 and may be tightened or loosened to fix base 40 relative to cross-member 34 or permit limited relative horizontal adjustment thereof along the conveyor belt axis. Also included in base member 40 are a pair of horizontally spaced upwardly extending pivot blocks 46 and a transversely extending pivot stop 48, the function of which will be described hereinafter in further detail.

Movably mounted on the frame 30, and more particularly the base member 40 thereof, are the means which actually effect inversion of the article X being transported by conveyor belt 20. The inverting means comprises a carrier arm A in the form of an arm 52 and an article-engaging member B in the form of an inverter shoe 54. More specifically, the carrier arm 52 comprises a braced pair of rigid members 52a, 52b pivotally mounted at points 49 by pivot brace 53 to the upper front corners of pivot blocks 46. Downward travel of the end of the carrier arm 52 supporting the article-engaging member 54 is limited by the presence in the projected travel path of carrier arm 52 of a transversely extending pivot stop 48 disposed forwardly of and below pivot points 49.

The shoe 54 comprising the article engaging member B generally comprises a first part 56 defining the angled section C and a second part 57 defining the arcuately bowed section D. More particularly, the angled section or first part 56 has one leg 58 pivotally amounted at points 65 on a pivot rod 59 in the forward and downward end portion of the carrier arm 52 at a point spaced from the vertex of the angled section 56 and the other leg 60 extending rearwardly and downwardly from the vertex, preferably at a right angle to leg 58. The arcuately bowed section or second part 57 extends forwardly from the free end of leg 60, beginning at the intersection point 61 with leg 60 and terminating at a point just beyond its intersection with a hypothetical extension of the axis of leg 58. A central longitudinal slot 71 extends rearwardly from the free end of section 57. Preferably the article-engaging surfaces of the arcuately bowed section 57 and leg 60 are provided with a surface 62 which precludes slippage of the article X being inverted relative to the surface 62. If desired, the surface 62 may be extended over the article-engaging surface of leg 58 as well. The surface 62 preferably contains transverse ridges 24 which function in the manner of transverse ridges 24 of the conveyor belt surface 22, but surface 62, like surface 22, may alternatively be formed of other materials providing a non-slip or positive engagement with the article.

In order to maintain proper biasing of the article-engaging member 54 relative to the carrier arm 52, leg 58 extends rearwardly beyond pivot points 65 and terminates in a transversely extending end portion 66 which is connected to the carrier arm 52 by biasing means, such as a strong compression spring 70 capable of entering slot 71. In order that spring 70 contains the requisite degrees of resiliency and extensibility, so that the article-engaging member 54 may pivot extensively about points 65 but yet be strongly biased to return to its original position relative thereto, it is preferred that end portion 66 of leg 58 not be connected by spring 70 to carrier arm 52 directly, but rather to a U-shaped extension 72 thereof. As illustrated, extension 72 has its two leg ends affixed to the carrier arm 52 at points intermediate pivot points 49 and 65 and extends upwardly of the point of attachment substantially vertically when the carrier arm 52 is at its rest position. The upper transverse end of the arm extension 72 is attached to spring 70, so that a spring 70 of considerable length, and hence extensibility, may be utilized.

It is to be noted that the surface of carrier arm 52 adjacent end portion 66 acts as a pivot stop which precludes rotation of the article-engaging member 54 under the influence of spring 70 to a point beyond that at which leg 58 is generally parallel to the axis of the carrier arm 52. Accordingly, when the article-engaging member 54 is in a position relative to carrier arm 52 which is determined only by the presence of biasing means 70 (and not by interaction with an article X to be inverted), the junction point 61 of the angled section 56 and the arcuately bowed section 57 is almost directly below pivot points 65. This is a preferred at rest orientation for the specific embodiment illustrated.

When it is desired to invert less than all of the articles X being transported by conveyor belt 20, a brace 74 on the free or upper rear end portion of carrier arm 52 may be connected to the base 40 in such a manner as to permit the free end portion to be raised or lowered, and thus, the article-engaging member 54 to be removed from or lowered into the path of travel of the articles X, as desired. To this end, the pivoting means E comprises a pistoned pressure cylinder 80, one end of the cylinder 80 being pivotally mounted on the base member 40 at point 81, and the projecting end of the piston being pivotally mounted on brace 74 of the free end portion of the carrier arm 52 at point 83. As air or other fluid under pressure is introduced into cylinder 80 through flexible tubing 82, the free end portion of the carrier arm 52, and hence the article-engaging member 54 at the other end portion, will follow the same or an inverse pattern, respectively, with article-engaging member 54 either being raised above the plane of the top of the articles not intended for inversion or downwardly into the plane of the top of the articles intended for inversion. As illustrated, carrier arm 52 is normally biased to a position in which the article-engaging member 54 is positioned to invert each article, and activation of cylinder 80 by air or other fluid under pressure acts to cause the free end portion of carrier arm 52 (carrying brace 74) to pivot downwardly about pivot points 49 with the result that the article-engaging member 54 is elevated above the plane of the article. A pistoned pressure cylinder 80' is disposed the same as cylinder 80, but is not connected to tube 82 and functions merely as a shock absorber to smooth out the pivotal motion of carrier arm 52 in response either to actuation/deactuation of air cylinder 80 or to contact with an article to be inverted. While air cylinders 80, 80' have been shown as controlling the orientation of carrier arm 52, clearly other means such as hydraulically actuated piston cylinders or even manual techniques may similarly be used for the purpose.

Referring now to FIGS. 4–9, therein illustrated is a sequence of schematics showing the operation of the inverter apparatus of the present invention. For pedagogic purposes, the guide rails 14 have been omitted entirely, and the special article-engaging surfaces 62, 22 have only partially been indicated. Referring now to FIG. 2, an article to be inverted, such as box X, has an initially leading surface Y, preferably essentially vertical, and an initially trailing surface Z as the conveyor belt 20 transports the article X forwardly in the direction of the phantom-line arrow between the upstanding members 32 and below the cross-member 34. The action of spring 70, in the absence of any contact of the article-engaging member 54 with the article X, has caused the article-engaging member 54 to assume the maximum clockwise rotation possible about pivot points 65, so that leg 58 thereof is essentially parallel to the axis of the carrier arm 52. The height of pivot points 49 has previously been fixed by adjustment of the height of cross-member 34 (and hence base 40) so that the article-engaging member intercepts the travel path of the article X to be inverted. Preferably, the height has been adjusted so that the intersection line 61 will contact the bottom of a leading portion Y' of leading surface Y at a point spaced from the top thereof by the length of leg 60.

Figure 4:
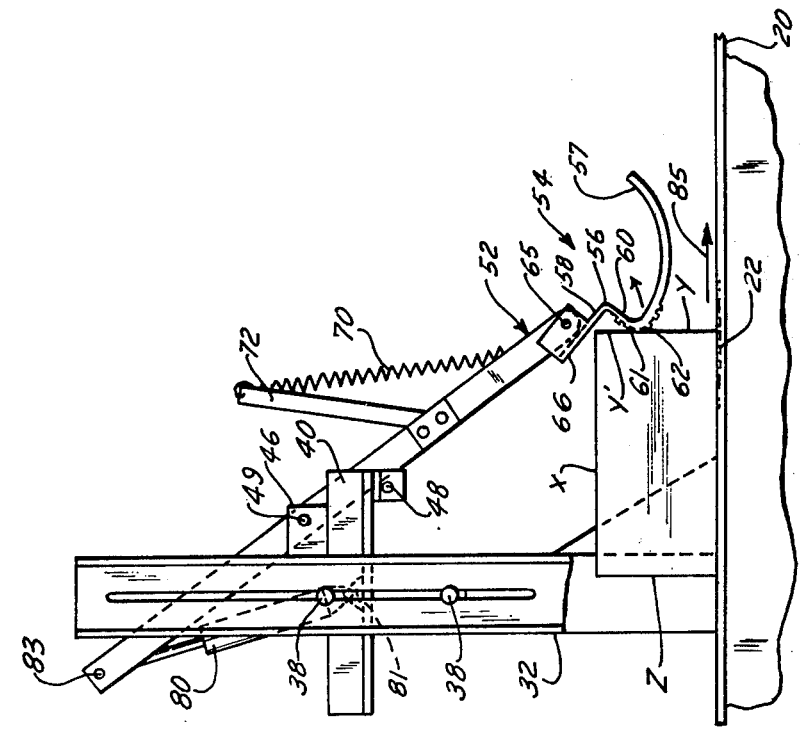

Referring now to FIG. 4, immediately after the leading portion Y' of surface Y of article X contacts the intersection line 61 of the article-engaging member 54, the forward movement of leading portion Y' causes the article-engaging member 54 to pivot counter-clockwise slightly about pivot poins 65, with leg 58 of angled section 56 approaching the upper edge of the leading portion Y'. Further forward motion of article X in the direction of the horizontal arrow 85 will result in further counter-clockwise rotation of the article-engaging member 54 until the upper leading corner of article X is firmly engaged by the angled section 56. At this point, further counter-clockwise rotation of the article-engaging member 54 in response to exclusively forward motion of the article X will be impossible due to the abutment of leg 58 thereof against the top of the article X. At this point, leg 60 will positively restrict forward motion of the leading portion Y'.

Figure 5:
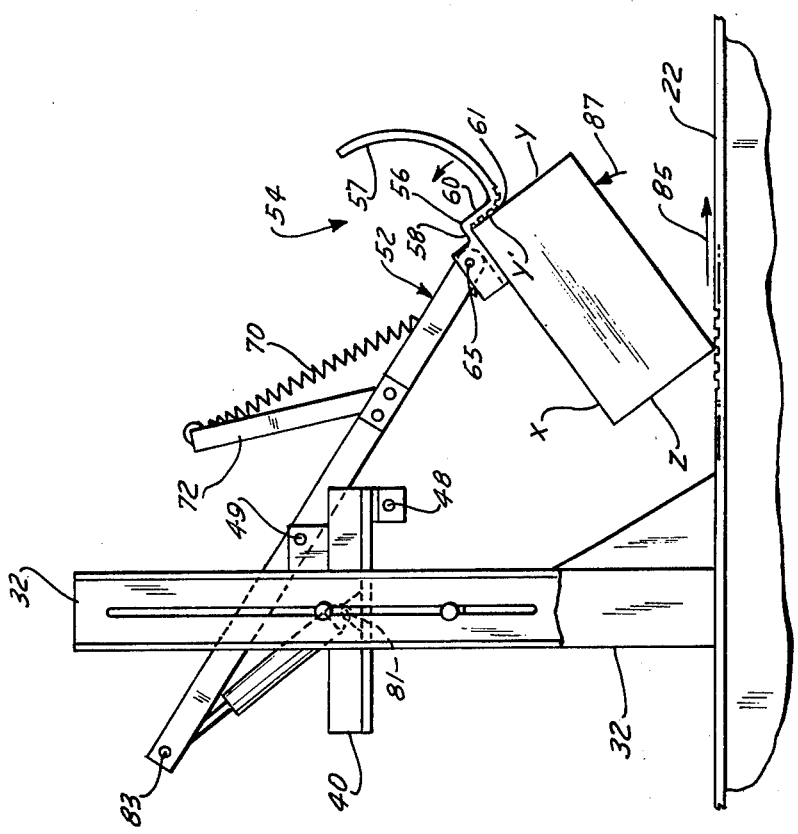

Referring now to FIG. 5, with the conveyor belt 20 driving the trailing portion Z of article X in the direction of the horizontal arrow 85 and the forward motion of the leading portion Y' in the direction of the horizontal arrow 85 being restricted (i.e., relative to the forward motion of the trailing portion Z) by leg 60 of the article-engaging means 56, the leading portion Y' of article X is driven upwardly (as indicated by the curved arrow 87) and the carrier arm 52 moves off pivot stop 48 and increasingly pivots counterclockwise about pivot points 49.

Referring now to FIG. 6, eventually the article X is inverted 90°, at which point the leg 60 (previously restricting the forward motion of the leading portion Y' relative to the forward motion of the trailing portion Z) is now parallel to the travel path of article X and incapable of restricting the leading portion Y' exclusively by virtue of its configuration. Nonetheless, the action of spring 70 tends to cause a clockwise rotation of the article-engaging member 54 with the result that intersection line 61 retains a frictional engagement with leading portion Y' which will be sufficient to cause it to invert still further into an unstable overcenter position.

Referring now to FIG. 7, the article X is in an unstable overcenter position and would fall into the fully inverted position on the conveyor belt 20 (as indicated by curved arrow 87) were it not for the action of the arcuately bowed section 57. While the weight of the article X is typically sufficient to cause carrier arm 52 to lower and resume its at rest position abutting pivot stop 48, the tendency of the leading portion Y' to drop further is restrained by the spring 70 acting through the article-engaging member 54. As illustrated in FIGS. 7-9, the arcuately bowed section 57 is so configured and dimensioned that the point of contact between the leading surface Y and the arcuately bowed section 57 travels along the surface of the latter from intersection line 61 towards the other end thereof, at all times maintaining a squeezing pressure against the leading surface Y, which restricts rearward movement of leading surface Y and hence restricts dropping thereof. It will be seen that the controlled release of the article X, once it has reached the unstable overcenter position of FIG. 7, is dependent upon two factors, the non-slip connection between the arcuately bowed section 57 and the article X and the non-slip interaction between the conveyor belt 20 and the article X. Indeed, where the article to be inverted is not of a fragile nature, and thus does not require a controlled release, it is possible to dispense with the special non-slip linings 22 and 62 and permit the article to fall without control from the unstable overcenter position to the fully inverted position.

It will be noted that as the article X passes from the unstable overcenter position to its fully inverted position, the article-engaging member 54 undergoes a clockwise rotation about pivot points 65 which not only insures continuing contact between the arcuately bowed section and the leading surface Y, but also assists in returning the article-engaging member 54 to its original or at rest position. Indeed, immediately after the instant illustrated in FIG. 9, wherein the article X and the arcuately bowed section 57 are about to terminate their engagement, spring 70 is free to return the article-engaging member 54 to its original position as shown in FIG. 2. The inverting apparatus is then ready to invert the next article X being transported by the conveyor 20. Alternatively, if pressure fluid is introduced into cylinder 80 through tube 82, the piston withdraws its cylinder 80 until carrier arm 52 has been rotated to a position in which the article-engaging member 54 is no longer in the travel path of the article X, but in a plane thereabove. Subsequent release of fluid pressure from cylinder 80 permits carrier arm 52 to return to its normal position under the influence of gravity.

To summarize, a mechanism has been provided for inverting selected fragile articles on a conveyor belt without damage thereto resulting from an uncontrolled drop. The inversion operation relies entirely upon gravity, various biasing means contained in the inverting mechanism, and the action of the conveyor belt on the article to be inverted, without additional control or energy supplied to the inversion mechanism.

Now that the preferred embodiments of the present invention have been described and shown in detail, various modifications and improvements thereon will become readily apparent to those skilled in the art. For example, the pressure cylinders used to control orientation of the carrier arm may by replaced by a cam shaft which raises and lowers the carrier arm at selected intervals to establish a pattern of inversion and non-inversion of the articles carried by the conveyor. Accordingly, the spirit and scope of the present invention is to be limited only by the appended claims, and not by the foregoing disclosure.

I claim:

1. Apparatus for inverting an article designed for use with a conveyor transporting the article, said article when thus transported having an initially leading portion and an initially trailing portion, comprising:
   A. a support;
   B. first means movably mounted on said support, said first means extending into the travel path of said article on the conveyor and when engaging said article being effective to restrict the forward motion of said leading portion relative to the forward motion of said trailing portion and cause said leading portion to rise relative to said trailing portion until said article is partially inverted to an overcenter position; and
   C. second means comprising a pressure-transmitting member fixedly mounted on said first means and a biasing member operatively connected to said support and said pressure-transmitting member, said biasing member being effective to cause said pressure-transmitting member to permit said over-center leading portion to descent, but to temporarily maintain engagement with said article as said leading portion descends and resist the rearward motion of said leading portion relative to the forward motion of said trailing portion, whereby said article is controllably deposited on the conveyor in a fully inverted position.

2. The apparatus of claim 1 wherein said second means continuously maintains engagement with said article as said leading portion descends and resists the rearward motion of said leading portion relative to the forward motion of said trailing portion substantially until said article is fully inverted, thereby to controllably deposit said article on the conveyor.

3. The apparatus of claim 1 wherein said leading portion is defined by an essentially vertical surface of said article and said first and second means engage said vertical surface in turn.

4. The apparatus of claim 3 wherein said first means engages one section of said vertical surface, and said second means engages at least in part a different section of said vertical surface.

5. The apparatus of claim 4 wherein said first means releases engagement of said one surface section as said second means engages said different surface section.

6. The apparatus of claim 1 wherein said second means maintains engagement with said leading portion and limits the rearward motion of said leading portion relative to the forward motion of said trailing portion until said article assumes a 180° inverted position.

7. In combination with the apparatus of claim 1, a conveyor on which said article is adapted to be conveyed, said conveyor including means engagable with said trailing portion and effective to preclude slippage of said trailing portion relative to said conveyor.

8. The apparatus of claim 7 wherein said conveyor means includes a conveyor belt for transporting said article, said belt defining a plurality of transverse ridges for positive engagement with said article.

9. The apparatus of claim 1 comprising a carrier arm articulately mounted on said support and biased toward the travel path of said article from above, and wherein said first and second means together comprise an article-engaging member movably mounted on a portion of said carrier arm close to said article and extending from said carrier arm into the travel path of said article for engagement with said article.

10. The apparatus of claim 9 additionally including means for pivoting said carrier arm to a position wherein said article-engaging member is raised above the top of said article.

11. Apparatus for inverting an article designed for use with a conveyor transporting the article, said article when thus transported having an initially leading portion and an initially trailing portion, comprising:
   A. a support;
   B. a carrier arm articulately mounted on said support and biased toward the travel path of said article from above;
   C. first means movably mounted on a portion of said carrier arm close to said article, said first means extending into the travel path of said article on the conveyor and when engaging said article being effective to restrict the forward motion of said leading portion relative to the forward motion of said trailing portion until said article is partially inverted to an overcenter position; said first means defining an angled section having a first leg pivotally mounted on the forward portion of said carrier arm at a point spaced from the vertex of said angled section and a second leg extending into the travel path of said article; and
   D. second means movably mounted on said support, said second means permitting said overcenter leading portion to descend, whereby said article is deposited on the conveyor in a fully inverted position; said second means defining an arcuately bowed section extending from said second leg for maintaining supporting pressure on said overcenter leading portion by urging said overcenter leading portion towards the conveyor until said article is in a substantially fully inverted position.

12. The apparatus of claim 11 wherein said arcuately bowed section includes a plurality of transverse ridges for positive engagement with said article.

13. The apparatus of claim 11 wherein said arcuately bowed section is configured and dimensioned so that the point of contact between said overcenter leading portion and said arcuately bowed section travels along the surface of said arcuately bowed section from an end portion thereof adjacent said second leg towards the other end portion thereof.

14. The apparatus of claim 11 wherein said legs of said angled section form a right angle and said first leg is biased to an axis parallel to the axis of said carrier arm.

15. The apparatus of claim 11 wherein said arcuately bowed section is configured and dimensioned to maintain supporting pressure by exerting against said article a force having a component in the direction of travel of said article.

16. The apparatus of claim 11 wherein said article-engaging member is pivotally mounted on said carrier arm at a pivot point and biased, relative to said carrier arm, to a position wherein said first leg of said angled section is substantially parallel to said carrier arm.

* * * * *